US008219104B2

(12) United States Patent
Mochizuki (10) Patent No.: US 8,219,104 B2
(45) Date of Patent: Jul. 10, 2012

(54) RADIO RESOURCE ALLOCATION WHICH OPTIMIZES SYSTEM THROUGHPUT USING A SMALL AMOUNT OF COMPUTATION

(75) Inventor: Takashi Mochizuki, Tokyo (JP)

(73) Assignee: NEC Corporation, Tokyo (JP)

( * ) Notice: Subject to any disclaimer, the term of this patent is extended or adjusted under 35 U.S.C. 154(b) by 973 days.

(21) Appl. No.: 12/103,962

(22) Filed: Apr. 16, 2008

(65) Prior Publication Data

US 2008/0261608 A1  Oct. 23, 2008

(30) Foreign Application Priority Data

Apr. 23, 2007 (JP) ................................. 2007-113263

(51) Int. Cl.
*H04W 72/06* (2009.01)
*H04W 72/10* (2009.01)
*H04B 7/00* (2006.01)

(52) U.S. Cl. ........... 455/450; 455/69; 455/509; 370/329
(58) Field of Classification Search .................. 455/450, 455/452.1, 509; 370/329, 343–344, 431
See application file for complete search history.

(56) References Cited

U.S. PATENT DOCUMENTS

| 2005/0063336 | A1* | 3/2005 | Kim et al. ................... 455/452.1 |
| 2005/0068884 | A1* | 3/2005 | Yoon et al. ..................... 370/203 |
| 2005/0226199 | A1* | 10/2005 | Kimura ......................... 370/345 |
| 2006/0063543 | A1 | 3/2006 | Matoba et al. |
| 2006/0246916 | A1* | 11/2006 | Cheng et al. ................... 455/450 |
| 2007/0232341 | A1* | 10/2007 | Sakata ........................... 455/509 |

FOREIGN PATENT DOCUMENTS

| JP | 2006-94005 | 4/2006 |
| JP | 2006-191533 | 7/2006 |

OTHER PUBLICATIONS

M. Morretti, et al., Proceedings of 2006 IEEE 63rd Vehicular Technology Conference (VTC2006-Spring), vol. 5, pp. 1-5 (2109-2113), 2006.
Y.J. Zhang, et al., "IEEE Transactions of Wireless Communications (IEEE Trans. Wireless Communications)", vol. 3, No. 5, pp. 1566-1575, 2004.
W. Rhee, et al., Proceedings of 2000 IEEE 51st Vehicular Technology Conference (VTC2000-Spring), vol. 2, pp. 1085-1089, 2000.
Nagata et al., "Wireless Communications System," IEICE Technical Report, vol. 104, No. 440, pp. 31-36, 2004.
Teng et al., "Wireless Communications System," IEICE Technical Report, vol. 102, No. 550, pp. 83-88, 2003.

* cited by examiner

*Primary Examiner* — Nick Corsaro
*Assistant Examiner* — Tangela T. Chambers
(74) *Attorney, Agent, or Firm* — Dickstein Shapiro LLP (57) ABSTRACT

A radio resource allocation method is provided wherein one of a plurality of mobile stations is allocated to one or each of a plurality of frequency blocks. The method comprises: (a) calculating allocation index representing transmission quality of each of said mobile stations in said each of frequency blocks; (b) extracting for said each of frequency blocks, a mobile station having a largest allocation index as a candidate mobile station; (c) extracting a mobile station having a largest allocation index in all of said frequency blocks, as a target mobile station for allocation; and (d) extracting, from among said frequency blocks, frequency block(s) for which said candidate mobile station matches said target mobile station, as candidate frequency block(s).

4 Claims, 6 Drawing Sheets

RADIO RESOURCE ALLOCATION WHICH OPTIMIZES SYSTEM THROUGHPUT USING A SMALL AMOUNT OF COMPUTATION

REFERENCE TO RELATED APPLICATION

This application is based upon and claims the benefit of the priority of Japanese Patent Application No. 2007-113263, filed on Apr. 23, 2007, the disclosure of which is incorporated herein in its entirety by reference thereto.

TECHNICAL FIELD

The present invention relates to a radio (wireless) resource allocation apparatus and a radio resource allocation method of allocating a plurality of mobile stations to a plurality of subcarriers. More specifically, the invention relates to a radio resource allocation apparatus and a radio resource allocation method of allocating the mobile stations to subcarriers, according to difference in subcarrier propagation characteristics for the respective mobile stations.

BACKGROUND ART

In recent years, a multicarrier system, more specifically, an orthogonal frequency division multiple access (Orthogonal Frequency Division Multiple Access, OFDMA) system is drawing attention, as a wireless communications system.

When the OFDMA is applied in a downlink in a mobile communications system, throughput of the system can be improved by allocating a mobile station with a good propagation characteristic to each subcarrier.

Figure 3:
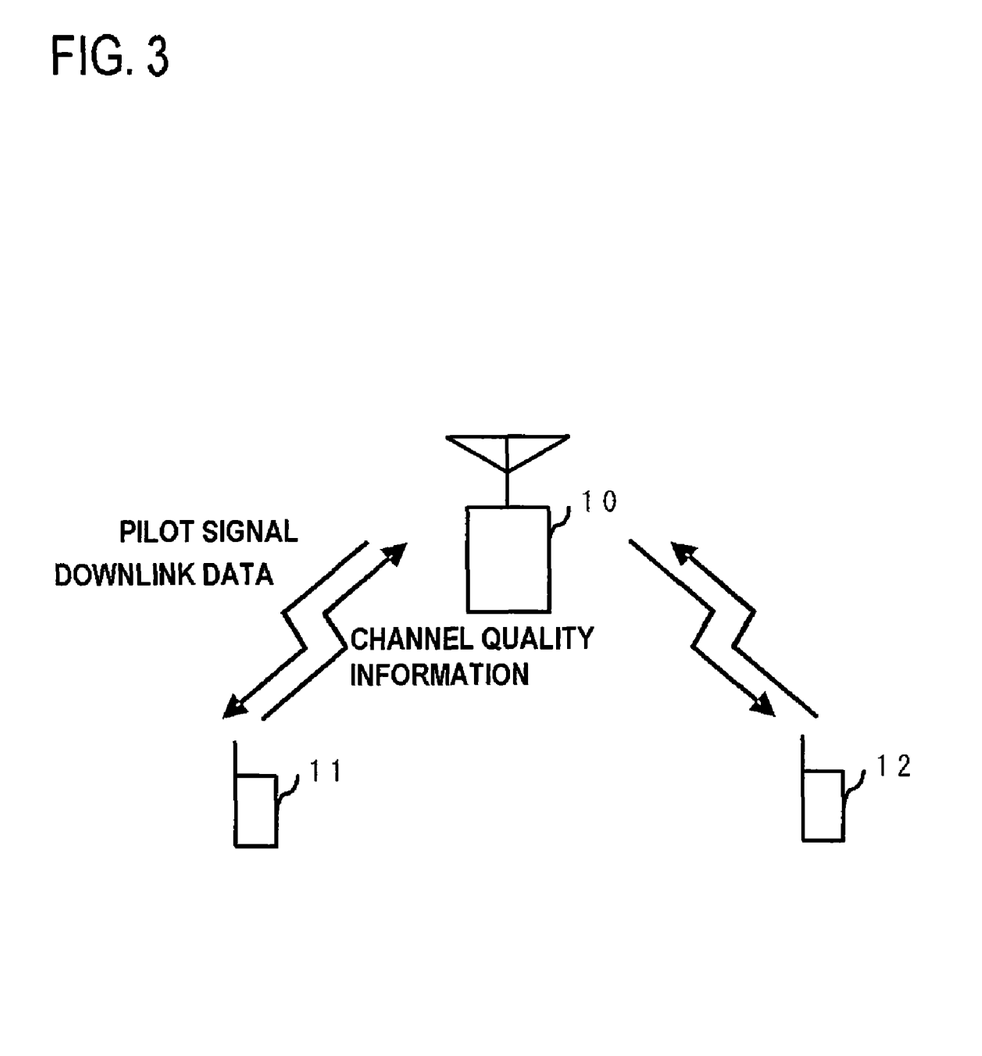
FIG. 3 is a diagram showing a configuration of a wireless (radio) communications system.

FIG. 3 is a diagram showing a configuration of a wireless communications system formed of a base station 10 and mobile stations 11 and 12.

The base station 10 performs mobile station allocation for each frequency block formed of one or a plurality of subcarriers and according to the propagation characteristic of a downlink.

The base station 10 transmits a pilot signal to the mobile stations 11 and 12 through the downlink in order to obtain information on the propagation characteristic for each subcarrier in the downlink, for example. Each of the mobile stations 11 and 12 measures reception quality of the pilot signal, and transmits to the base station through an uplink the measured reception quality as channel quality information.

Normally, the channel quality information is transmitted for each frequency block rather than an individual subcarrier, in order to reduce transmission amount of the channel quality information. Allocation of the mobile stations 11 and 12 is also performed for each frequency block.

Figure 4:
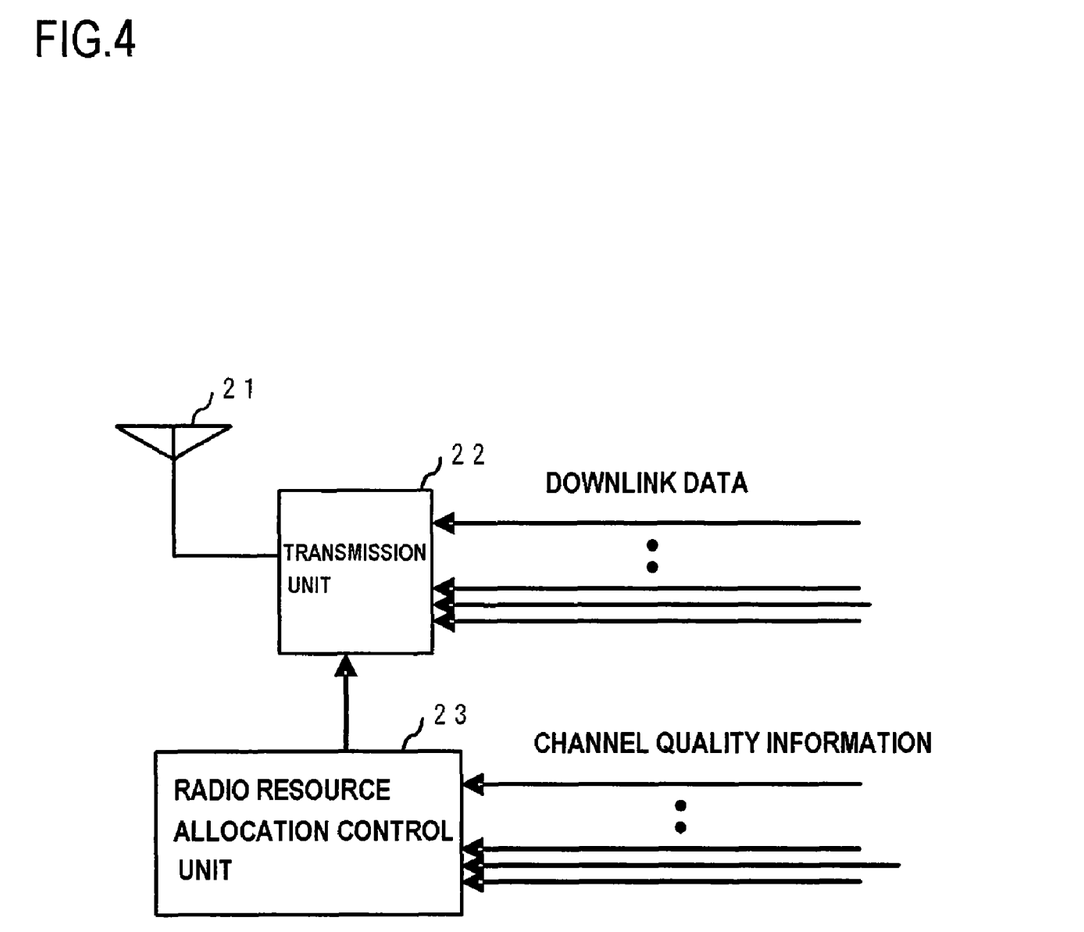
FIG. 4 is a diagram showing a configuration of a base station in the conventional wireless communications system.

FIG. 4 is a diagram showing a configuration example of the base station 10.

A radio resource allocation control unit 23 determines allocation of the mobile stations 11 and 12 based on the channel quality information on each of the mobile stations 11 and 12 for each subcarrier and instructs the allocation to a transmission unit 22.

The transmission unit 22 allocates downlink data for the mobile stations 11 and 12 to subcarriers according to the instruction of the radio resource allocation control unit 23 and transmits the downlink data through a transmission antenna 21.

Such a radio resource allocation technique is disclosed in "Wireless communications System", IEICE Technical Report, Vol. 104, No. 440, pp. 31-36 (Non-Patent Document 1), for example. Non-Patent Document 1 discloses that, using either an instantaneous value (an "instantaneous received SINR") of a received signal to interference plus background noise power ratio (Signal-to-Interference plus background noise power ratio, SINR) in each frequency block, or a value obtained by normalizing the instantaneous received SINR by an average received SINR as an evaluation criterion for allocation, a mobile station with the largest evaluation value is allocated to each frequency block, thereby allowing improvement in the throughput. The average received SINR is obtained by temporally averaging the instantaneous SINRs.

[Patent Document 1] JP Patent Kokai Publication No. JP-P-2006-094005A

[Patent Document 2] JP Patent Kokai Publication No. JP-P-2006-191533A

[Non-Patent Document 1] Nagata et al (other four), "Wireless communications System", IEICE Technical Report, Vol. 104, No. 440, pp. 31-36, 2004

[Non-Patent Document 2] Teng et al (other three), "Wireless communications System", IEICE Technical Report, Vol. 102, No. 550, pp. 83-88, 2003

[Non-Patent Document 3] M. Morretti et al (other one), Proc. 2006 IEEE 63rd Vehicular Technology Conference (VTC2006-Spring), Vol. 5, pp. 2109-2113, 2006

[Non-Patent Document 4] Y. J. Zhang et al (other one), IEEE Trans. Wireless Communications, Vol. 3, No. 5, pp. 1566-1575, 2004

[Non-Patent Document 5] W. Rhee et al (other one), Proc. 2000 IEEE 51st Vehicular Technology Conference (VTC2000-Spring), Vol. 2, pp. 1085-1089, 2000

The following analyses are given by the present invention. The entire disclosures of the above mentioned Patent and Non-Patent Documents are herein incorporated by reference thereto.

Figure 5:
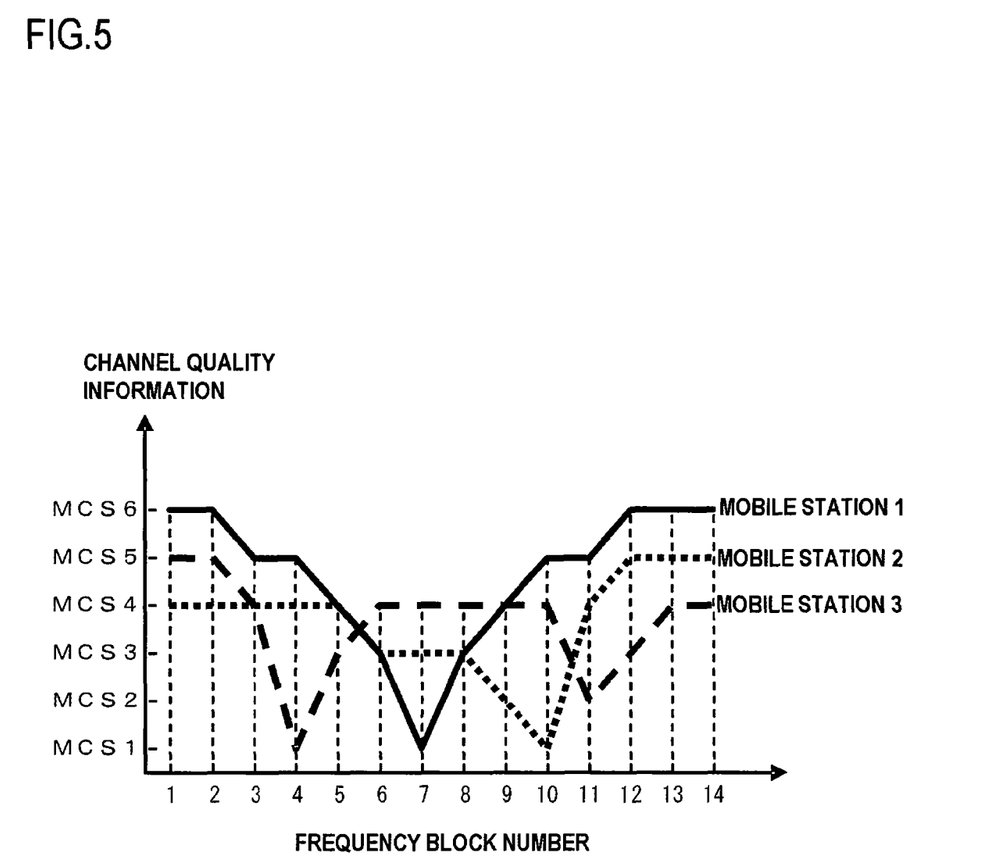
FIG. 5 is a graph showing examples of channel quality information on a plurality of mobile stations in each frequency block.

FIG. 5 shows an example of channel quality information on a plurality of mobile stations in each of frequency blocks.

Generally, the channel quality information corresponds to a modulation and coding scheme (Modulation and Coding Scheme, MCS) which satisfies a reception error rate of a certain reference value or less. The channel quality information in FIG. 5 is indicated by MCS1 to MCS6, respectively.

Figure 6:
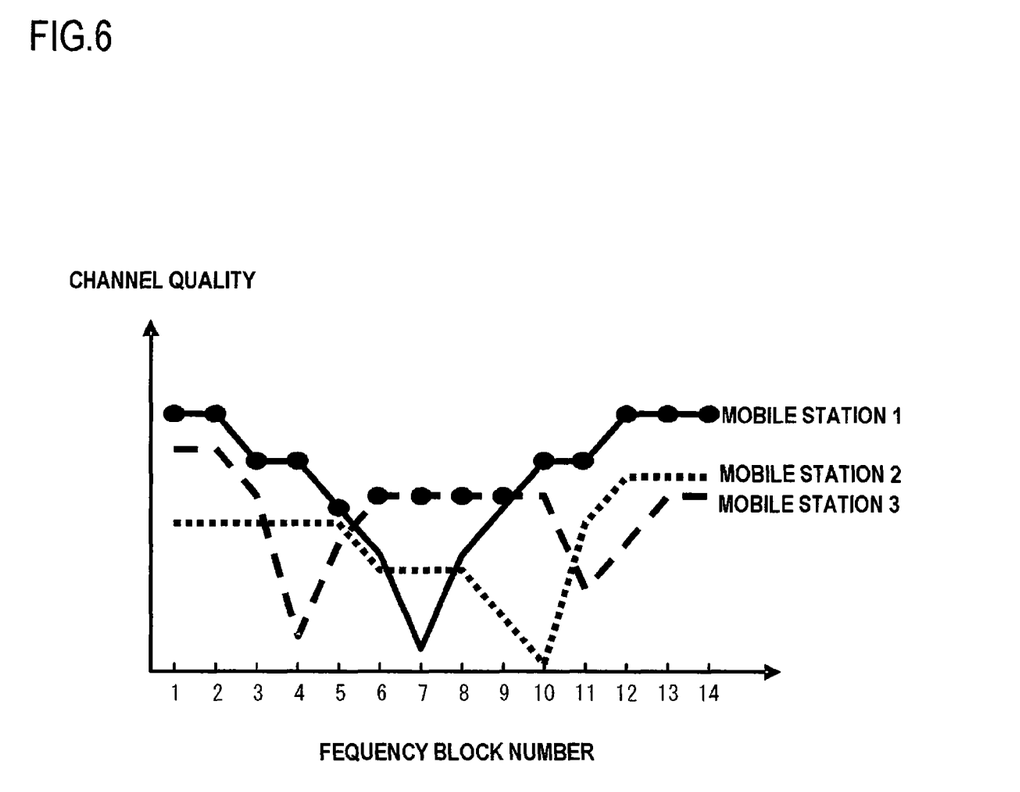
FIG. 6 is a graph showing examples of allocation indices of the mobile stations in each frequency block.

FIG. 6 shows an example of allocation indices for the mobile stations in each of the frequency blocks.

In the case of the characteristic in FIG. 6, frequency blocks #1 to #5 and frequency blocks #10 to #14 are allocated to a mobile station 1, while frequency blocks #6 to #9 are allocated to a mobile station 3.

The MCSs shown in FIG. 5 are applied to the mobile stations for which allocation has been performed, for each frequency block.

The followings analyses are given by the present invention. The above mentioned patent documents and non-patent documents are incorporated herein by reference thereto.

In Non-Patent Document 1, a mobile station is allocated independently, for each frequency block as a unit. In each frequency block, an MCS (shown in FIG. 5) in accordance with the channel quality of the allocated mobile station in that frequency block is applied.

On the other hand, adoption of the following method in a next-generation mobile communications system is under discussion, in which when a plurality of frequency blocks are allocated to each mobile station, a fixed MCS be applied per each of mobile stations over the frequency blocks.

In order to apply certain fixed MCS to a plurality of the frequency blocks while an MCS is changing, an MCS in a frequency block having a worst propagation characteristic cannot help being applied to all the frequency blocks so as to suppress the reception error rate within certain reference value or less. Accordingly, compared with a case where an individual MCS is applied to each frequency block per unit as in a conventional art, the transmission rate is likely to be more reduced. Consequently, frequency utilization efficiency may be reduced when the allocation method for the mobile station disclosed in Non-Patent Document 1 is applied to the next-generation mobile communications system without alteration.

In the example in FIG. 5, MCS6 can be applied to the frequency blocks #1, #2, and #12 to 14 among the frequency blocks allocated to the mobile station 1. However, MCS4, which is two levels lower than MCS6, needs to be applied to a frequency block #5. After all, it cannot be helped to apply the MCS4 in the frequency block #5 to the mobile station 1.

In order to determine a set (combination) of frequency blocks to be allocated to each mobile station that achieves the maximum system throughput while changing the combination of frequency blocks under a constraint condition that certain MCS is applied to a plurality of frequency blocks, a vast amount of computation is needed. The vast amount of computation is needed especially when the number of mobile stations and the number of frequency blocks are large.

When the frequency block #5 be allocated to the mobile station 2 instead of the mobile station 1 in the example in FIG. 5, MCS5 being one level higher than the MCS4 can be applied to the mobile station 1. Further, since the channel quality of the mobile station 2 in the frequency block #5 is the same as that of the mobile station 1, the number of bits transmitted through the frequency block #5 remains unchanged from that before the allocation is changed.

Accordingly, by changing the allocation, the total transmission rate achieved by all the mobile stations can be increased.

Further, with respect to the frequency blocks #3, #4, #10, and #11 as well, when the frequency blocks #3, #4, #10, and #11 be allocated to the mobile station 2 or 3 rather than the mobile station 1, the transmission rate obtained by summing up transmission rates of all the mobile stations may be more increased.

The number of alternatives for such allocation for each frequency block may be considered to be equal to the number of mobile stations. In other words, in the example in FIG. 5, it is necessary to consider $3^{14}$ combinations. Thus, a vast amount of computation is necessary for achieving the optimum throughput of the system.

Accordingly, it is an object of the present invention to provide a radio resource allocation apparatus and a radio resource allocation method that can optimize system throughput with a small amount of computation, particularly, when one of a plurality of mobile stations is allocated to one or each of a plurality of frequency blocks, and when there is a constraint condition that certain constant MCS be applied per each mobile station.

According to a first aspect of the present invention there is provided a radio resource allocation method of allocating one of a plurality of mobile stations to one or each of a plurality of frequency blocks. The radio resource allocation method comprises:

(a) calculating allocation index representing transmission quality of each of the mobile stations in each of frequency blocks;

(b) extracting for each of frequency blocks, a mobile station having a largest allocation index as a candidate mobile station;

(c) extracting a mobile station having a largest allocation index in all of the frequency blocks, as an allocated mobile station for allocation; and (d) extracting, among the frequency blocks, frequency block(s) for which the candidate mobile station matches the allocating mobile station, as candidate frequency block(s).

The method further comprises:

(e) sorting the candidate frequency blocks in descending order of magnitude of the allocation index;

(f) sequentially allocating the sorted candidate frequency blocks to the target mobile station by adding the sorted frequency block one by one, and also selecting a modulation and coding scheme applicable to the target mobile station; and (g) calculating a transmission rate to be achieved by the target mobile station, based on the modulation and coding scheme and the number of the allocated candidate frequency blocks.

The method further comprises:

(h) allocating to the allocating mobile station a set of the candidate frequency blocks when the transmission rate has reached a transmission rate requested by the allocated mobile station or when a transmission rate has assumed a maximum value;

(i) excluding the allocated mobile station and the candidate frequency blocks allocated to the allocated mobile station, and (j) repeating the steps (b) through (i) until no allocation candidate mobile station or no allocation candidate frequency block is left.

According to a second aspect of the present invention there is provided a radio resource allocation apparatus of allocating one of a plurality of mobile stations to one or each of a plurality of frequency blocks. The radio resource allocation apparatus comprises:

an allocation index calculation unit that calculates an allocation index representing transmission quality of each of the mobile stations in the each of frequency blocks;

a candidate mobile station extraction unit that extracts, for the each of frequency blocks, a mobile station having a largest allocation index as a candidate mobile station;

a target mobile station extraction unit that extracts a mobile station having a largest allocation index in all of the frequency blocks, as a target mobile station; and a candidate frequency block extraction unit that extracts, from among the frequency blocks, frequency block(s) for which the candidate mobile station matches the allocating mobile station, as candidate frequency block(s).

The apparatus further comprises:

a frequency block sorting unit that sorts the candidate frequency blocks in descending order of magnitude of the allocation index;

a modulation and coding scheme selection unit that sequentially allocates the sorted candidate frequency blocks to the target mobile station by adding the sorted frequency block(s) one by one, and also selects a modulation and coding scheme applicable to the target mobile station; and a transmission rate calculation unit that calculates a transmission rate to be achieved by the target mobile station, based on the modulation and coding scheme and the number of the allocated candidate frequency blocks.

The apparatus further comprises:

a frequency block allocation unit that allocates to the target mobile station a set of the candidate frequency blocks when the transmission rate has reached a transmission rate requested by the target mobile station or when the transmission rate has assumed a maximum value; and a control circuit that excludes the allocated mobile station and the candidate frequency blocks allocated to the allocated mobile station, and causes the candidate mobile station extraction unit, the candidate frequency block extraction unit, the frequency block sorting unit, the modulation and coding scheme selection unit, the transmission rate calculation unit, and the frequency block allocation unit to repeat operation until no allocation candidate mobile station or no allocation candidate frequency block is left.

The radio resource allocation method according to a first mode may comprise:

sorting in a higher order one of the candidate frequency blocks having an allocation index of a second largest magnitude which is smaller in the candidate frequency blocks, when candidate frequency blocks having the allocation index of a same magnitude are included in the sorting step (e).

In the radio resource allocation apparatus according to a second mode, when candidate frequency blocks having an allocation index of a same magnitude are included, the frequency block sorting unit is so configured that one of the candidate frequency blocks having an allocation index of a second largest magnitude which is smaller in the candidate frequency blocks is sorted in a higher order.

Meritorious effect of the present invention is mentioned below, however, without limitative active nature.

According to the radio resource allocation method or the radio resource allocation apparatus of the present invention, when one or each of the frequency blocks is allocated to one of the mobile stations and when a constraint condition that certain MCS is applied for each mobile station is present, system throughput can be optimized with a small amount of computation.

DESCRIPTION OF REFERENCE NUMERALS 10 base station
11, 12 mobile station
21 transmission antenna
22 transmission unit
23 radio resource allocation control unit
31 allocation index calculation unit
32 candidate mobile station extraction unit
33 target mobile station extraction unit
34 candidate frequency block extraction unit
35 frequency block sorting unit
36 modulation and coding scheme (MCS) selection unit
37 transmission rate calculation unit
38 frequency block allocation unit
39 control circuit

PREFERRED MODES OF THE INVENTION

Figure 1:
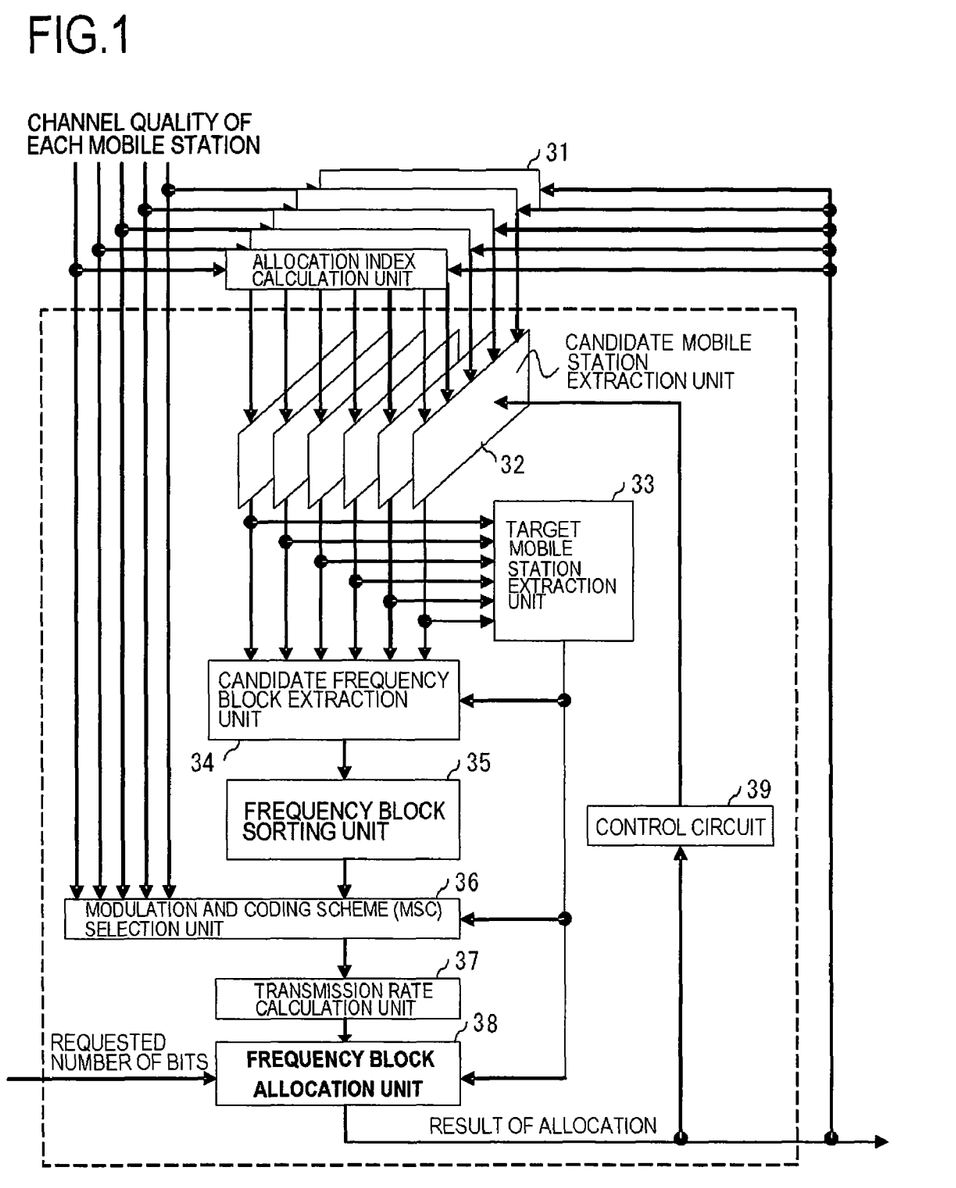
FIG. 1 is a diagram showing a configuration of a radio resource allocation apparatus according to an exemplary embodiment of the present invention.

A radio resource allocation apparatus according to the present invention is a radio resource allocation apparatus that allocates a plurality of frequency blocks (which means the frequency blocks each formed of one or a plurality of subcarriers) to a plurality of mobile stations. The radio resource allocation apparatus includes an allocation index calculation unit 31, a candidate mobile station extraction unit 32, a target mobile station extraction unit 33, a candidate frequency block extraction unit 34, a frequency block sorting unit 35, an MCS selection unit 36, a transmission rate computation unit 37, a frequency block allocation unit 38, and a control circuit 39. Based on an index representing a propagation characteristic of each mobile station for each frequency block, the allocation index calculation unit 31 calculates an index that serves as an evaluation measure on the assumption that the frequency block is allocated to each mobile station, as an allocation index. The candidate mobile station extraction unit 32 extracts for each frequency block a mobile station having a largest allocation index. The target mobile station extraction unit 33 extracts a mobile station having an allocation index thereof being the largest in all the frequency blocks, as a target (allocatable) mobile station (may be termed) "allocatable mobile station"). The candidate frequency block extraction unit 34 extracts a frequency block for which the allocating mobile station has the largest allocation index, as an allocation candidate. The frequency block sorting unit 35 rearranges frequency blocks selected as allocation candidates in the order of the allocation index. The MCS selection unit 36 determines a modulation and coding scheme to be applied when the frequency blocks are sequentially allocated to the target (allocatable) mobile station in the order of the rearrangement. The transmission rate calculation unit 37 calculates a transmission rate based on the modulation and coding scheme and the number of the frequency blocks. The frequency block allocation unit 38 determines frequency block allocation in which a transmission rate has reached a number of bits requested for the target mobile station or the transmission rate has become a maximum, as a frequency allocation for the target mobile station. The control circuit 39 stores allocation statuses between the mobile stations and the frequency blocks in the course of allocation processing and performs control so that the allocation processing is repeated until no allocation candidate mobile station is left or allocation of all the frequency blocks is completed.

Next, an exemplary embodiment of the present invention will be described in detail with reference to drawings.

FIG. 1 is a diagram showing a configuration of the radio resource allocation apparatus according to the exemplary embodiment of the present invention.

The allocation index calculation unit 31 calculates allocation index of each frequency block based on channel quality information, for each mobile station. When the calculation is performed, a previous radio resource allocation result may be referred to as necessary.

The control circuit 39 records allocation statuses between the mobile stations and the frequency blocks.

The candidate mobile station extraction unit 32 refers to the allocation statuses between the mobile stations and the frequency blocks, recorded in the control circuit 39. The candidate mobile station extraction unit 32 extracts for each of unallocated frequency blocks an unallocated mobile station having a largest allocation index from among the unallocated mobile stations, based on allocation indices calculated by the allocation index calculation unit 31.

The target mobile station extraction unit 33 detects, from among the mobile stations each having the largest allocation index for the respective frequency blocks, extracted by the candidate mobile extraction unit 32, a mobile station having the largest allocation index. This extracted mobile station is targeted for allocation in subsequent processing.

The candidate frequency block extraction unit 34 selects a frequency block for which the mobile station extracted by the target mobile station extraction unit 33 matches the mobile station having the largest allocation index, extracted by the candidate mobile station extraction unit 32 for each of the frequency blocks. The selected frequency block is determined to be one targeted for allocation.

The frequency block sorting unit 35 rearranges the frequency blocks selected by the candidate frequency block extraction unit 34 in (descending) order of magnitude of the allocation indices.

The MCS selection unit 36 determines an MCS to be applied based on the channel quality information when the frequency block(s) is (are) allocated in the order of sorting by the frequency block sorting unit 35 to the mobile station extracted by the target mobile station extraction unit 33.

The transmission rate calculation unit 37 calculates the transmission rate based on the MCS determined by the MCS selection unit 36 and the current number of the frequency blocks.

The frequency block allocation unit 38 refers to the number of bits requested for the mobile station targeted for allocation. The frequency block allocation unit 38 determines allocation of a frequency block for which the transmission rate calculated by the transmission rate calculation unit 37 has reached a requested number of bits or the transmission rate is maximum. Thereupon the frequency block allocation unit 38 outputs information on the determined frequency block allocation together with current MCS information, as an allocation result.

The control circuit 39 updates information on allocation between the mobile station(s) and the frequency block(s), stored therein, according to the result output from the frequency block allocation unit 38.

Then, as far as there is an allocated block and (or) an unallocated mobile station, the control circuit 39 performs control so that the above-mentioned processing by the candidate mobile station extraction unit 32 through the frequency block allocation unit 38 is repeated.

The above description was given relating to the configuration of the exemplary embodiment in detail. Since the calculation of the allocation index by the allocation index calculation unit 31 and the determination of the MCS by the MCS selection unit 36 are well known by those skilled in the art, detailed descriptions of the calculation of the allocation index and the determination of the MCS are omitted.

Figure 2:
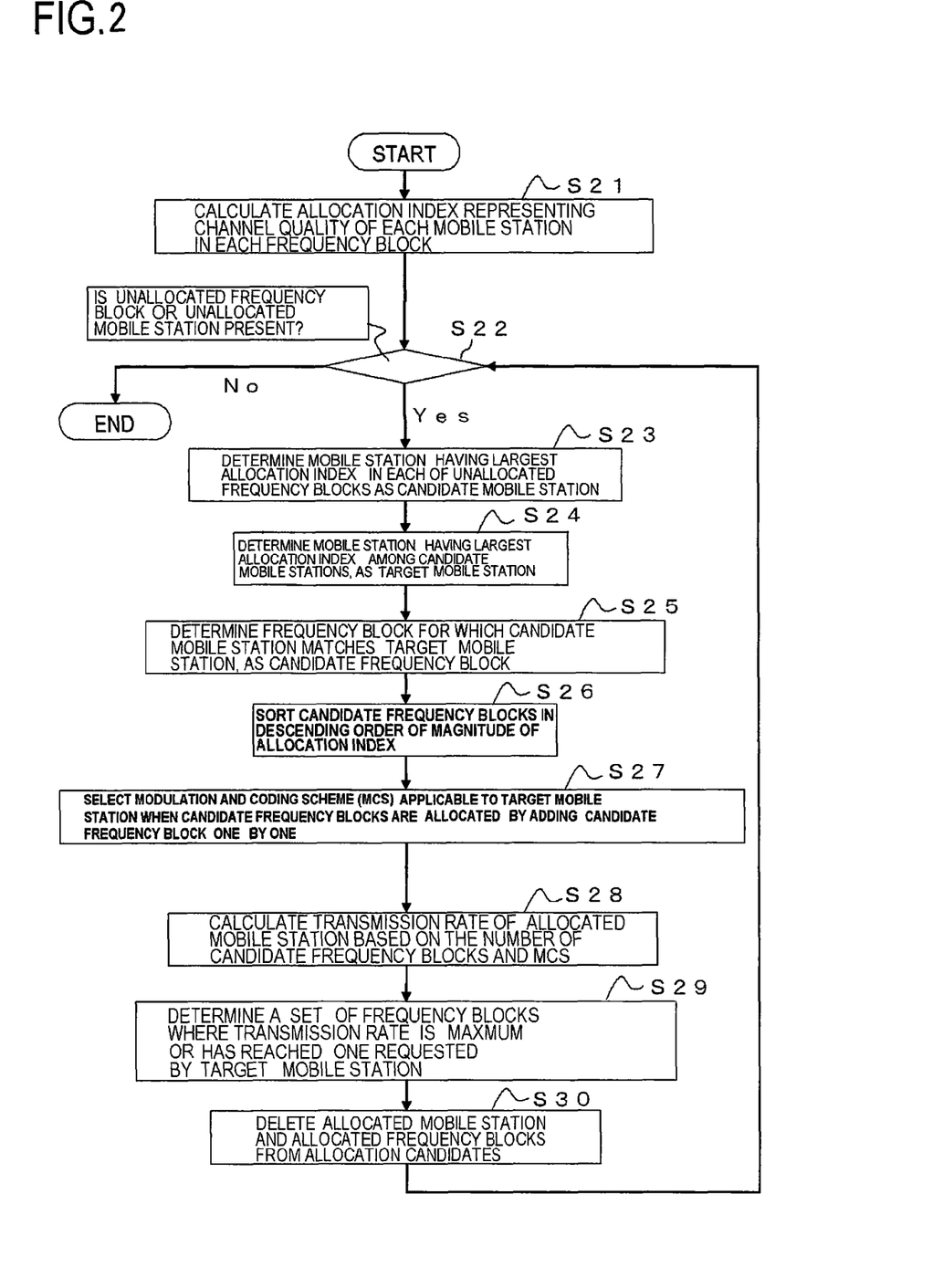
FIG. 2 is a flowchart for explaining a radio resource allocation method according to the exemplary embodiment of the present invention.

Next, operation of the radio resource allocation apparatus according to the exemplary embodiment of the present invention will be described with reference to a flowchart in FIG. 2.

The allocation index calculation unit 31 calculates an allocation index representing channel quality information on each of mobile stations in each of frequency blocks (in step S21).

The control circuit 39 determines whether or not there is an unallocated frequency block, and whether or not there is a mobile station left as an allocation candidate. When there is the unallocated frequency block and there is the mobile station left as the allocation candidate, the procedure proceeds to step S23 (in step S22). When there is no unallocated frequency block and there is no mobile station left as the allocation candidate, allocation processing is completed.

The candidate mobile station extraction unit 32 extracts, as a candidate mobile station, a mobile station having the largest allocation index in each of unallocated frequency blocks (in step S23).

The target mobile station extraction unit 33 extracts a mobile station having the largest allocation index among the mobile stations extracted in step 23, and determines an extracted mobile station as a target mobile station (in step S24).

The candidate frequency block extraction unit 34 extracts a frequency block(s) for which the candidate mobile station extracted in step S23 matches the target mobile station extracted in step S24, as a candidate frequency block (in step S25).

The frequency block sorting unit 35 sorts candidate frequency blocks extracted in step S25 in descending order of magnitude of the allocation index (in step S26).

The MCS selection unit 36 selects an applicable MCS when the sorted candidate frequency blocks are allocated to the target mobile station with the number of the sorted candidate frequency blocks being incremented one by one (in step S27).

In order to suppress (i.e. limit) a reception error rate within certain reference value, it is preferable to apply to all of the frequency blocks an MCS for the candidate frequency block having a worst propagation characteristic, or an MCS of a lowest level. Other method may be of course applied, which does not influence the effect of the present invention.

The transmission rate calculation unit 37 calculates the transmission rate based on the number of the candidate frequency blocks targeted for allocation and the MCS selected in step S27 (in step S28).

The frequency block allocation unit 38 determines a set (combination) of the candidate frequency blocks for which the transmission rate calculated in step S28 has become a maximum or has reached the number of bits requested for the mobile station targeted for allocation, as the frequency blocks to be allocated to the mobile station (in step S29).

The control circuit 39 excludes the mobile station targeted for allocation and the frequency blocks allocated in step S29 from the allocation candidates (in step S30). Then, the procedure returns to step S22.

The above content of processing will be specifically described using respective characteristics of the channel quality information in FIG. 5 and the allocation index in FIG. 6 by way of example.

When allocation processing is executed initially, all mobile stations and all frequency blocks are set to the allocation candidates in step S22. Then, the procedure proceeds to step S23.

In step S23, mobile station 1 is selected for frequency blocks #1 to #5 and #10 to #14, and mobile station 3 is selected for frequency blocks #6 to #9, as allocation candidates mobile stations.

In step S24, the mobile station 1 is selected as an allocatable mobile station.

In step S25, the frequency blocks #1 to #5 and #10 to #14 are selected as candidates frequency blocks.

In step S26, the frequency blocks described above are rearranged. Since the frequency blocks #1 and #2 and #12 to #14 have the same allocation index, the rearrangement is made in ascending order of numbers assigned to the frequency blocks #1 and #2 and #12 to #14, respectively, for example.

Since the frequency blocks #3, #4, #10, and #11 also have the same allocation index, the same processing is performed.

The frequency block #5 has the lowest allocation index. Thus, the order of allocation becomes the last by rearrangement, resulting in rearranged order of: #1, #2, #12, #13, #14/#3, #4, #10, #11/#5.

In step S27, it is assumed that the frequency blocks rearranged in step S26 are sequentially allocated to the mobile station 1 in descending order of magnitude of the allocation index. In each case, the channel quality information in FIG. 5 is referred to, and an MCS that limits the reception error rate within a predetermined reference value is thereby determined.

Specifically, the channel quality information on the frequency blocks #1 and #2 and #12 to #14 is at MCS6. The channel quality information on the frequency blocks #3, #4, #10, and #11 is at MCS5. The channel quality information on the frequency block #5 is at MCS4. Thus, when the frequency blocks #1, #2, and #12 to #14 are allocated, the MCS to be applied is determined to be MCS6, for example. When the frequency blocks #3, #4, #10, and #11 are allocated in addition to the frequency blocks described above, the MCS to be applied is determined to be MCS5. Then, when the frequency block #5 is included for allocation, the MCS to be applied is determined to be MCS4.

In step S28, the transmission rate is calculated based on the MCS determined in step S27 and the number of the frequency blocks.

In step S29, allocation where the transmission rate calculated in step S28 has reached the number of bits (i.e., transmission rate) requested for the mobile station 1 or becomes the maximum is determined to be an allocation for the mobile station 1.

When the MCS described in step S27 is applied, comparison is made among a case where five frequency blocks are allocated using MCS6, a case where nine frequency blocks are allocated using MCS5, and a case where 10 frequency blocks are allocated using MCS4. Then, an allocation where the largest transmission rate is achieved is selected.

When the largest transmission rate is achieved in the allocation of the nine frequency blocks excluding the frequency block #5, the frequency block #5 is not allocated to the mobile station 1. When the transmission rate has reached the number of bits requested for the mobile station 1 during the course of the step, the allocation is completed at that point of time.

The following description will be made, assuming that the frequency blocks except the frequency block #5 are allocated to the mobile station 1.

In step S30, the mobile station 1 and the frequency blocks #1 to #4 and #10 to #14 are excluded from the allocation candidates, and the procedure is returned to step S22.

In step S22 executed for the second time, it is determined that the unallocated mobile stations 2 and 3 and the frequency blocks #5 to #9 are left. Thus, the procedure proceeds to step S23.

In step S23 executed for the second time, the mobile station 2 is selected for the frequency block #5, and the mobile station 3 is selected for the frequency blocks #6 to #9.

In step S24 executed for the second time, the mobile station 3 is selected.

In step S25 executed for the second time, the frequency blocks #6 to #9 are selected.

In step S26 executed for the second time, the frequency blocks are sorted in ascending order of the numbers assigned to the frequency blocks in the same manner as with the mobile station 1 because the frequency blocks #6 to #9 have the same allocation index.

In step S27 executed for the second time, the channel quality information on the frequency blocks #6 to #9 is at MCS4, which is the same for all the frequency blocks #6 to #9. Thus, MCS4 may be applied to any set (combination) of the frequency blocks.

In step S28 executed for the second time as well, the transmission rate is calculated based on the MCS determined in step S27 and the number of the frequency blocks.

In step S29 executed for the second time, in case where the transmission rate calculated in step S28 has reached the number of bits requested by the mobile station 3 or becomes the maximum, allocation is determined to be an allocation for the mobile station 3.

The channel quality information on the frequency blocks #6 to #9 is the same MCS4. Thus, all the four frequency blocks are allocated when the number of bits requested by the mobile station 3 is larger than four for the MCS4.

In step S30 executed for the second time, the (allocated) mobile station 3 and the (allocated) frequency blocks #6 to #9 are excluded from the allocation candidates, and the procedure is returned to step S22.

In step S22 executed for the third time, the unallocated mobile station (mobile station 2) and the unallocated frequency block (#5) are left. Thus, the procedure proceeds to step S23.

In step S23 executed for the third time, the frequency block #5 becomes the allocation candidate for the mobile station 2.

In S24 executed for the third time, the mobile station 2 is selected.

In S25 executed for the third time, the frequency block #5 is selected.

In step S26 executed for the third time, it is not necessary to perform rearrangement because there is only one frequency block.

In step S27 executed for the third time, the channel quality information on the frequency block #5 is at MCS4. Thus, MCS4 is selected.

In step S28 executed for the third time as well, the transmission rate is calculated based on the MCS determined in step S27 and the number of the frequency blocks.

There is only one frequency block. Thus, in step S29 executed for the third time, the frequency block #5 is allocated to the mobile station 2 as long as the number of bits requested by the mobile station 2 is not zero.

In step S30 executed for the third time, the mobile station 2 and the frequency block #5 are excluded from the allocation candidates. Then, the procedure is returned to step S22.

In step S22 executed for the fourth time, the allocation processing is completed because no unallocated mobile stations and no unallocated frequency blocks are left.

As described above, in the above exemplary embodiment, allocation of the set (combination) of the frequency blocks where the transmission rate corresponds to the number of bits requested by the mobile station or becomes the maximum is sequentially performed, starting from the mobile station having the largest allocation index. This allocation is performed under a constraint condition that the same MCS is applied to the mobile station. Thus, the frequency blocks can be efficiently allocated without unnecessary allocation.

When the allocation index is the same in step S26, the allocation indices of the mobile stations that are the second largest in the respective frequency blocks may be compared, and the priority may be given to the frequency block of which the second largest allocation index is smaller. With this arrangement, when the frequency block concerned is not allocated to the allocation candidate mobile station, the frequency block having a higher allocation index for other mobile station is left. The frequency block having the higher allocation index can be thereby efficiently utilized.

When the second largest allocation indices are also the same, the allocation indices of the lower order may be compared.

When a plurality of transmission priorities is set to mobile station data, the procedure of the present invention may be applied, starting from data with the highest transmission priority. Then, allocation for transmission of data with the next highest transmission priority should be performed to remaining frequency blocks.

As the transmission priority, whether the data is to be transmitted again or whether transmission in real time is required for the data may be pointed out.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A radio resource allocation method, wherein one of a plurality of mobile stations is allocated to one or each of a plurality of frequency blocks; the method comprising:
    (a) calculating an allocation index representing transmission quality of each of said mobile stations in said each of frequency blocks;
    (b) extracting for said each of frequency blocks, a mobile station having a largest allocation index, as a candidate mobile station;
    (c) extracting a mobile station having a largest allocation index in all of said frequency blocks, as a target mobile station for allocation;
    (d) extracting, from among said frequency blocks, frequency block(s) for which said candidate mobile station matches said target mobile station, as candidate frequency block(s);
    (e) sorting said candidate frequency blocks in descending order of magnitude of the allocation index;
    (f) sequentially allocating said sorted candidate frequency blocks to said target mobile station by adding the sorted frequency block one by one, and also selecting a modulation and coding scheme applicable to the target mobile station;
    (g) calculating a transmission rate to be achieved by said target mobile station, based on said modulation and coding scheme and the number of the allocated candidate frequency blocks;
    (h) allocating to said target mobile station a set of the candidate frequency blocks when the transmission rate has reached a transmission rate requested by said target mobile station or when the transmission rate has become a maximum value;
    (i) excluding said allocated mobile station, and said candidate frequency blocks allocated to said allocated mobile station; and
    (j) repeating the steps (b) through (i) until no allocation candidate mobile station or no allocation candidate frequency block is left,
    wherein the allocation index increases as the transmission quality increases.

2. The radio resource allocation method according to claim 1, comprising:
    sorting in a higher order one of the candidate frequency blocks having an allocation index of a second largest magnitude which is smaller in the candidate frequency blocks, when candidate frequency blocks having the allocation index of a same magnitude are included in said sorting (e).

3. A radio resource allocation apparatus; wherein one of a plurality of mobile stations is allocated to one or each of a plurality of frequency blocks; the apparatus comprising:
    (a) an allocation index calculation unit that calculates an allocation index representing transmission quality of each of said mobile stations in said each of frequency blocks;
    (b) a candidate mobile station extraction unit that extracts, for said each of frequency blocks, a mobile station having a largest allocation index as a candidate mobile station;
    (c) a target mobile station extraction unit that extracts a mobile station having a largest allocation index in all of said frequency blocks as a target mobile station for allocation;
    (d) a candidate frequency block extraction unit that extracts, from among said frequency blocks, frequency block(s) for which said candidate mobile station matches said target mobile station, as candidate frequency block(s);
    (e) a frequency block sorting unit that sorts said candidate frequency blocks in descending order of magnitude of the allocation index;
    (f) a modulation and coding scheme selection unit that sequentially allocates said sorted candidate frequency blocks to said target mobile station by adding the sorted frequency block(s) one by one and also selects a modulation and coding scheme applicable to said target mobile station;
    (g) a transmission rate calculation unit that calculates a transmission rate to be achieved by said target mobile station, based on said modulation and coding scheme and the number of the allocated candidate frequency blocks;
    (h) a frequency block allocation unit that allocates to said target mobile station a set of the candidate frequency blocks when the transmission rate has reached a transmission rate requested by said target mobile station or when the transmission rate has become a maximum value; and
    (i) a control circuit that excludes said allocated mobile station and said candidate frequency blocks allocated to said allocated mobile station, and causes said candidate mobile station extraction unit, said candidate frequency block extraction unit, said frequency block sorting unit, said modulation and coding scheme selection unit, said transmission rate calculation unit, and said frequency block allocation unit to repeat operation until no allocation candidate mobile station or no allocation candidate frequency block is left,
    wherein the allocation index increases as the transmission quality increases.

4. The radio resource allocation apparatus according to claim 3, wherein when candidate frequency blocks having an allocation index of a same magnitude are included, said frequency block sorting unit is so configured that one of the candidate frequency blocks having an allocation index of a second largest magnitude which is smaller in the candidate frequency blocks is sorted in a higher order.

* * * * *